United States Patent [19]

Rekuc et al.

[11] Patent Number: 5,253,396
[45] Date of Patent: Oct. 19, 1993

[54] SNAP HOOK ASSEMBLY

[75] Inventors: Richard J. Rekuc, Pattenburg; James O'Shea, Jr., Annadale, both of N.J.

[73] Assignee: Royalox International Inc., Phillipsburg, N.J.

[21] Appl. No.: 7,592

[22] Filed: Jan. 22, 1993

[51] Int. Cl.5 .................................. A44B 13/00
[52] U.S. Cl. .................... 24/600.9; 24/601.1; 24/905
[58] Field of Search ............ 24/600.9, 601.1, 601.5, 24/601.7, 600.6, 698.9, 905

[56] References Cited

U.S. PATENT DOCUMENTS

| 404,659 | 6/1889 | Sears et al. | 24/600.9 |
| 450,818 | 4/1891 | Smith | 24/600.9 |
| 647,734 | 4/1990 | Wells, Jr. | 24/600.9 |
| 959,116 | 5/1910 | Covert | 24/600.9 |
| 1,804,377 | 5/1931 | Freysinger | 24/600.9 |
| 4,665,592 | 5/1987 | Kasai | 24/600.9 |

Primary Examiner—Victor N. Sakran
Attorney, Agent, or Firm—Herbert Dubno; Ronald Lianides

[57] ABSTRACT

A snap hook assembly in which a web loop is provided with a swivel having either a ball of disk formation at the end of a post. A portion of the body of the snap hook is formed in two halves divided along a longitudinal plane, one half being unitary with the hook portion and a cover member being connectable therewith. A cavity adapted to receive the swivel formation is formed at the longitudinal plane, occupying equal space in each snap hook half.

10 Claims, 2 Drawing Sheets

SNAP HOOK ASSEMBLY

FIELD OF THE INVENTION

The present invention relates, in general, to snap hooks, and, more particularly, to snap hooks provided with web loops.

BACKGROUND OF THE INVENTION

Normally, there are two methods used to attach the swivel portion of the body of a snap hook to the web loop.

In the first method, the body of the snap hook is provided with a stud having a ball or T formation at the end thereof defining the swivel, which fits through a circular opening of a collar formed on the frame of the web loop. The collar is then compressed into an oval shape, thus preventing the ball or T from being removed. The web loop can now rotate on the swivel without separating therefrom.

The drawback associated with this first embodiment is that in time, stress causes the oval shape of the collar to become circular again, thus allowing the web loop to separate from the swivel of the snap hook.

In the second method, the web loop is again formed with a circular collar on the frame of the loop. However, the snap hook swivel is formed by a stud extending through the collar and fitted with a cap or lock washer which is larger than the circular opening, thus preventing separation of the web loop from the snap hook and allowing the loop to rotate on the swivel without separation from the hook.

The drawback associated with the second embodiment is that in time, stress causes the cap or lock washer to loosen and finally to separate from the stud.

OBJECTS OF THE INVENTION

It is therefore an object of the present invention to provide an improved snap lock assembly which will obviate the aforementioned drawbacks.

It is another object of the present invention to provide a snap lock assembly in which the web loop will not separate from the snap hook swivel due to accumulated stress.

SUMMARY OF THE INVENTION

The above and other objects are attained in a snap hook assembly in which the web loop is provided with a swivel having either a ball or disk formation at the end of a stud. A portion of the body of the snap hook is formed in two halves divided along a longitudinal plane, one half being unitary with the hook and a cover member being connectable therewith. A cavity adapted to receive the swivel formation is formed at the longitudinal plane, occupying equal space in each snap hook half.

In assembly, the swivel formation is positioned in one of the cavities and the two halves brought together and fastened by a pair of studs extending from the hook half through the cover member and spread by a stud spinner. The web loop is now rotatably connected with the snap hook body in a manner which precludes any separation therefrom due to stress, the collar being eliminated and the body of the snap hook providing a distortion-free support for the web loop.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
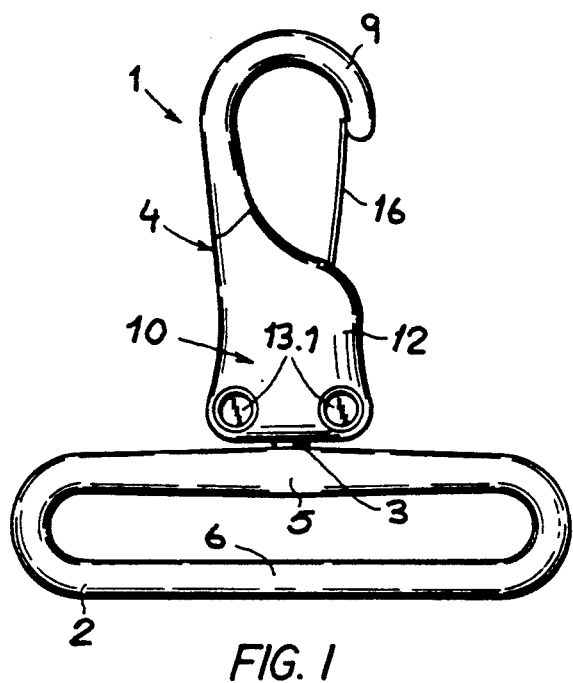
FIG. 1 is a front elevational view a snap hook assembly according to the invention.
Figure 2:
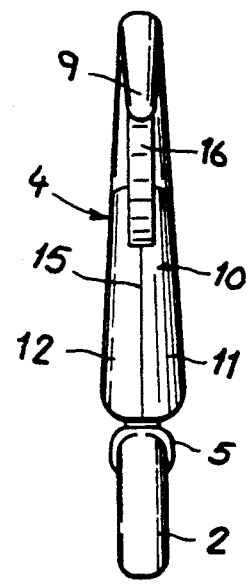
FIG. 2 is a right side elevational view thereof.
Figure 3:
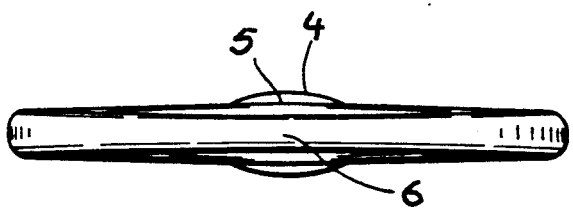
FIG. 3 is a bottom plan view thereof.

Referring to FIGS. 1-3 of the drawing, the snap hook assembly 1 is provided with an elongated web loop 2 having a swivel 3 extending therefrom into the body 4 of the snap hook. The central portion 5 of the frame of the web loop 2 from which the swivel 3 extends is both wider and thicker than the opposite central side 6 of the frame. The swivel 3 is formed by a stud 7 having a ball 8 formed at the end thereof.

Figure 4:
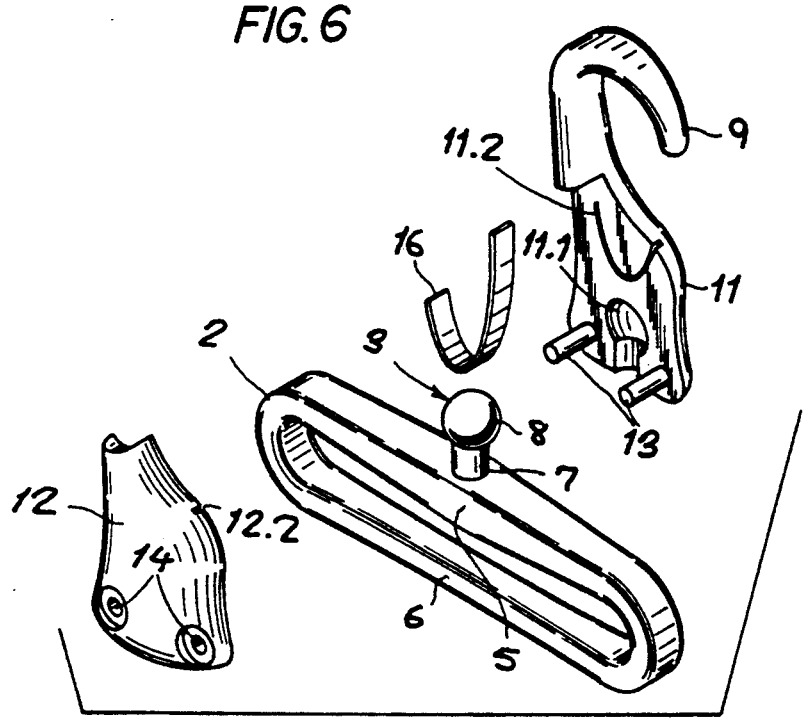
FIG. 4 is an exploded perspective view thereof.
Figure 5:
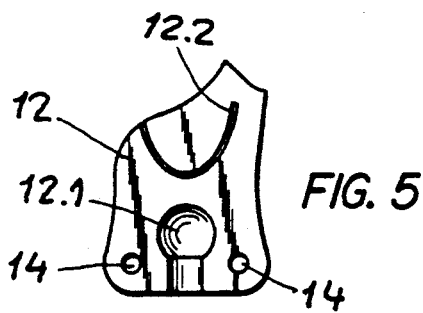
FIG. 5 is an elevational view of the inside face of the cover in FIG. 1.

The body 4 of the snap hook extends generally transverse to the web loop 2 and has a hook portion 9 which extends into a split portion 10 having one half 11 unitary with the hook portion 9 and a cover member half 12 which attaches to the half 11 by means of studs 13 extending from the half 11 and traversing openings 14 formed in cover member 12, shown with particularity in FIGS. 4 and 5, where they are spread by a stud spinner to form heads 13.1.

The two halves are joined along a longitudinal plane 15, and each half is formed with a respective hemispherical half cavity 11.1 and 12.1 opening at the plane 15, which when the halves are joined, form a spherical cavity adapted to receive and rotatably hold the swivel 3. The halves are also formed with respective arcuate recesses or grooves 11.2 and 12.2 opening at the plane 15 and adapted to receive a leaf spring 16, which engages the inner surface of the hook portion 9.

Figure 8:
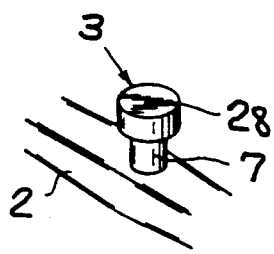
FIG. 8 a perspective view of an alternative swivel formation.

As mentioned earlier, the swivel 3 can alternatively have a disk formation 28, as shown in FIG. 8.

Figure 6:
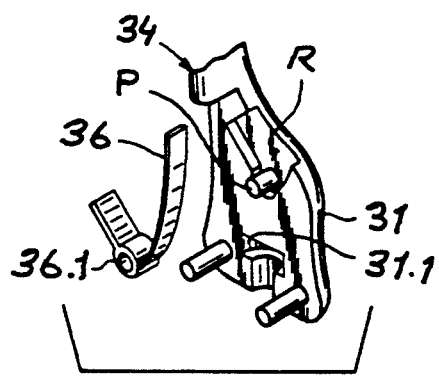
FIG. 6 is an exploded perspective view of a portion of another embodiment of the invention.
Figure 7:
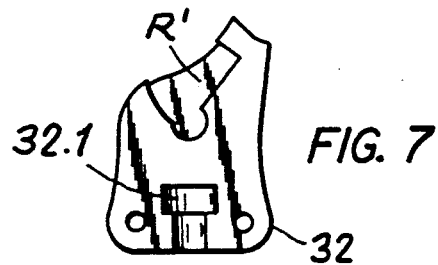
FIG. 7 is an elevational view similar to FIG. 5 of the inside face of a cover member to be used in the embodiment shown in FIG. 6.

In another embodiment of the invention shown in FIGS. 6 and 7, the snap hook has a body 34 formed with a unitary half 31 provided with a pivot pin P disposed in recess R and upon which the hub 36.1 of a leaf spring 36 is fitted, the respective recesses R of half 31 and R' of cover member 32 being adapted to receive the leaf spring 36. Each half of the split portion 31 and 32 is formed with a respective half cylindrical cavity 31.1 and 32.1, which when joined together form a cylindrical cavity. In all other respects, this alternative embodiment of the invention is identical to the first embodiment.

Figure 9:
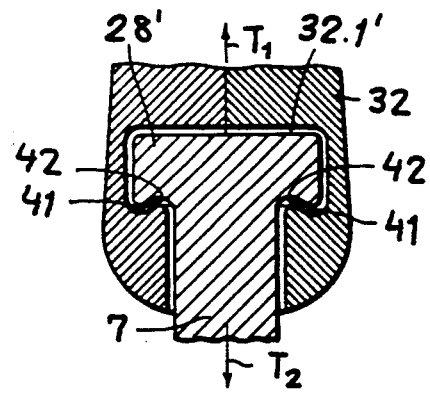
FIG. 9 is a cross sectional view through a stud formed with camming surfaces drawing opposite sides of the hole together.

The stud head 28' can have a concavity with an inwardly converging flank 42 (FIG. 9) cooperating with flanks 41 forming a concave slope of the hole. In this case a thrust in the direction of arrows $T_1$, $T_2$ can cause the flanks 41, 42 to engage and will draw the sides of the hole toward one another. Hence the tendency of the head to spread the hole can be effectively countered.

We claim:

1. A snap hook assembly comprising:

an elongated web loop;

a swivel extending generally transverse from a central location of said web loop, said swivel having a formation at a free end thereof;

a snap hook body having a hook portion, a split portion extending from said hook portion and having a first half unitary with said hook portion and a first planar inner surface formed thereon;

a cover member defining a second half of said split portion and formed with a second planar inner surface abutting said first inner surface;

a leaf spring coacting with said hook portion;

a first recess formed in said first half of said split portion at said first inner surface thereof and adapted to receive at least a first portion of said leaf spring;

a second recess formed in said second half of said split portion at said second surface thereof and in registration with said first recess and adapted to receive at least a second portion of said leaf spring;

a first cavity formed in said first half of said split portion at said first inner surface thereof and adapted to receive at least a first portion of said formation of said web loop swivel;

a second cavity formed in said second half of said split portion at said second inner surface thereof and in registration with said first cavity and adapted to receive at least a second portion of said formation of said web loop swivel; and means for fastening said cover member and said first half together.

2. The assembly defined in claim 1 wherein said means for fastening said cover member and said first half comprises a pair of studs extending from said first inner surface, said studs flanking said first cavity and each traversing a respective bore flanking said second cavity in said second half and expanded by a stud spinner.

3. The assembly defined in claim 2 wherein said swivel is formed by a post having a ball at the free end thereof.

4. The assembly defined in claim 3 wherein said first and second cavities are each hemispheres, whereby said swivel ball is supported over substantially the entire spherical surface thereof.

5. The assembly defined in claim 2 wherein said swivel is formed by a post having a boss at the free end thereof.

6. The assembly defined in claim 5 wherein said first and second cavities are each half cylinders, whereby said swivel boss is supported on substantially all of the surfaces thereof.

7. The assembly defined in claim 2 wherein said first and second recesses are arcuate grooves and said leaf spring is a continuous arcuate strip.

8. The assembly defined in claim 2 wherein said first recess is provided with a pivot pin which extends into said second recess and said leaf spring is an arcuate strip interrupted by a hub having a bore adapted to be fitted onto said pivot pin.

9. The assembly defined in claim 2 wherein the central portion of the frame of said web loop from which said swivel extends is both wider and thicker than the opposite central side of the frame, the opposite central side of the frame being narrower than any other portion of said web loop.

10. The assembly defined in claim 1 wherein said formation is a head formed with inwardly converging flanks and at least one of said cavities has a pair of flanks engageable with the flanks of said head whereby sides of said one of said cavities are drawn toward one another.

* * * * *